(12) United States Patent
Yuan et al.

(10) Patent No.: US 9,104,676 B2
(45) Date of Patent: Aug. 11, 2015

(54) HASH ALGORITHM-BASED DATA STORAGE METHOD AND SYSTEM

(75) Inventors: Qing Yuan, Shenzhen (CN); Jiangui Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 132 days.

(21) Appl. No.: 13/610,876

(22) Filed: Sep. 12, 2012

(65) Prior Publication Data

US 2013/0007008 A1      Jan. 3, 2013

Related U.S. Application Data

(63) Continuation of application No. PCT/CN2011/078564, filed on Aug. 18, 2011.

(30) Foreign Application Priority Data

Sep. 13, 2010    (CN) .......................... 2010 1 02817470

(51) Int. Cl.
    *G06F 17/30* (2006.01)
(52) U.S. Cl.
    CPC .... *G06F 17/30091* (2013.01); *G06F 17/30949* (2013.01)
(58) Field of Classification Search
    None
    See application file for complete search history.

(56) References Cited

U.S. PATENT DOCUMENTS

| | | | |
|---|---|---|---|
| 5,914,938 A * | 6/1999 | Brady et al. .................. 370/254 |
| 7,370,048 B2 * | 5/2008 | Loeb ..................................... 1/1 |
| 7,606,916 B1 * | 10/2009 | Potter et al. .................... 709/229 |
| 7,827,146 B1 * | 11/2010 | De Landstheer et al. ..... 707/651 |
| 2006/0143168 A1 | 6/2006 | Rossmann |
| 2007/0083531 A1 * | 4/2007 | Hussain ......................... 707/100 |
| 2009/0144402 A1 * | 6/2009 | Harrison ........................ 709/221 |

FOREIGN PATENT DOCUMENTS

| | | |
|---|---|---|
| CN | 101140592 A | 3/2008 |
| CN | 101247349 A | 8/2008 |
| CN | 101331496 A | 12/2008 |

OTHER PUBLICATIONS

The World Intellectual Property Organization (WIPO) International Search Report for PCT /CN2011/078564 Oct. 12, 2011.

* cited by examiner

*Primary Examiner* — Belix M Ortiz Ditren
(74) *Attorney, Agent, or Firm* — Anova Law Group, PLLC (57) ABSTRACT

A hash algorithm-based data storage method and apparatus are disclosed, including: pre-configuring L number of backend storage modules and a mapping relationship between identifiers of the backend storage modules and a modulo L operation; calculating a key value of data to be stored using a hash algorithm; performing a modulo L operation on the obtained key value and, using the mapping relationship between identifiers of the backend storage modules and the modulo L operation, outputting the key value in the modulo L operation and the corresponding data to a backend storage module with a corresponding backend storage module identifier; determining a preconfigured hash table in the backend storage module does not contain data to be stored, and storing the data to be stored and the corresponding key value. By using the present invention, requirements on storage devices can be lowered and the storage efficiency can be improved.

20 Claims, 5 Drawing Sheets

|   |       |       |       |       |       |
|---|-------|-------|-------|-------|-------|
| 0 | (0,0) | (0,1) | (0,2) | (0,3) | (0,4) |
| 3 | (1,0) | (1,1) | (1,2) | (1,3) | (1,4) |
| 6 | (2,0) | (2,1) | (2,2) | (2,3) | (2,4) |

HASH ALGORITHM-BASED DATA STORAGE METHOD AND SYSTEM

CROSS-REFERENCES TO RELATED APPLICATIONS

This application claims the priority of PCT application no. PCT/CN2011/078564, filed on Aug. 18, 2011, which claims the priority of Chinese patent application no. 201010281747.0, filed on Sep. 13, 2010, the entire contents of all of which are incorporated herein by reference.

FIELD OF THE INVENTION

The present invention generally relates to the field of data storage and, more particularly, to a hash algorithm-based data storage method and apparatus.

BACKGROUND

The Instant Messaging (IM) tool has a low technical threshold for users, and the users can express instantly their feelings by fewer sentences and share information with other users and friends. So the efficiency of information transmission by IM is relatively higher, and its application has become increasingly widespread.

In theory, the contact or friend list of an existing IM user has no size limit. Using various client side software, the user can in real-time receive published or broadcasted messages from members on the contact list. Therefore, the amount of data corresponding to the received messages is very large. How to effectively store the received message data and quickly query the stored data is among the technical problems to be solved for the development of the IM technology.

In existing technologies, an IM client often uses hash algorithms and uses hash tables to achieve fast data storage. In general, hash algorithms include: Cyclic Redundancy Check 32 (CRC32), Message-Digest Algorithm 5 (MD5), and Secure Hash Algorithm (SHA). Hash algorithms can be used to convert a data string into a number to generate a key value, and the key value can be used in a modulo operation by a large prime number M, so the data can be evenly distributed over the hash table with a size of M.

Figure 1:
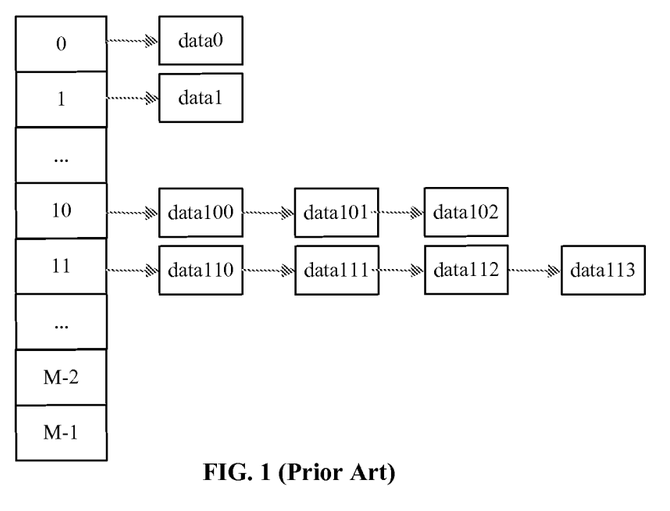
FIG. 1 is a schematic diagram of an existing hash algorithm-based data storage method.

FIG. 1 shows an existing hash algorithm-based data storage method. As shown in FIG. 1, using a hash algorithm, e.g., MD5, to numberize the data and to generate a key value as the first 8 bytes of numberized data, and then the key value is used to perform a modulo operation by a predetermined large prime number M. Further, the data and its corresponding key value are stored in the hash table mapped by the remainder of the modulo operation. The prime number M can be determined according to actual needs and the key value obtained by hashing the data.

When hashing different data generates the same key value, a key collision occurs, and all the data with the same key value is organized by a linked list in the hash table. As shown in FIG. 1, for data 100~data 102, their key values modulo M is the same 10; for data 110~data 113, their key values modulo M is the same 11, and these data items are stored by a respective linked list.

When a user needs to query the stored data, the data to be queried is first processed by the hash algorithm to generate a key value, and then the position of the data stored in the hash table can be determined using the modulo by the prime number M. Afterwards, the linked list at that position is searched. If data stored in the linked list matches the data to be queried, that data is obtained as corresponding to the key value, and the relevant information is returned to the user.

Therefore, because all data are stored in a single hash table, the required storage space is large and the requirement on storage equipment is high. At the same time, for data having a colliding key value when being stored, the hash table stores these data in the form of a linked list, each data item having the same key value, which causes difficulties for subsequent query and read operations. On the other hand, for data having no colliding key value, storage spaces for colliding key handling still need to be reserved in the hash table, and the prime number M based hash table needs to be traversed to ensure no same data existed before the data is stored, reducing the storage efficiency. Further, for non-colliding data stored in the hash table, the complexity of the query (efficiency) is related to the prime number M used in the hash table; while for the colliding data stored in the hash table, the complexity of the query is O(n), where n is the number of data items stored in the linked list. For example, to query data 111 in FIG. 1, the key value of data111 is first obtained, the Key%M (i.e., K modulo by M) is then calculated to obtain the remainder position, i.e., the index position as shown in location 11 in FIG. 1. Further, the linked list on the index position is traversed, until the data to be queried matches data111 stored in the hash table. The stored data 111 is then returned to the user. Thus, the speed of such data access is low, the complexity of the data access is high, and the query efficiency is low.

The disclosed methods and systems are directed to solve one or more problems set forth above and other problems.

BRIEF SUMMARY OF THE DISCLOSURE

One aspect of the present disclosure includes a hash algorithm-based data storage method. The method includes pre-configuring L number of backend storage modules, where each backend storage module has an identifier and L is a natural number greater than 1. The method also includes pre-configuring a mapping relationship between the identifiers of the backend storage modules and a modulo L operation, receiving data to be stored, and calculating a key value of the data to be stored using a hash algorithm. Further, the method includes performing the modulo L operation on the obtained key value to obtain a remainder and, based on the mapping relationship and the remainder, determining a corresponding backend storage module identifier. The method also includes outputting the key value and the corresponding data to a backend storage module with the corresponding backend storage module identifier. The method also includes determining that a preconfigured hash table in the backend storage module does not contain data to be stored, and storing the data to be stored and the corresponding key value in the preconfigured hash table.

Another aspect of the present disclosure includes a querying method for a hash algorithm-based data storage system having multiple preconfigured backend storage modules. The method includes receiving a query request for data to be queried and, based on a query request, obtaining a key value corresponding to the query request. The method also includes obtaining a mapping relationship between identifiers of the L number of backend storage modules and a modulo L operation, where L is a total number of the backend storage modules. Further, the method includes performing a modulo operation on obtained key value by the number of backend storage modules to obtain a remainder and, based on the mapping relationship and the remainder, select a backend storage module corresponding to the key value. The method also includes outputting the key value to the backend storage module, and searching a hash table of the selected backend storage module to obtain the data to be queried based on the key value.

Another aspect of the present disclosure includes a hash algorithm-based data storage system. The system includes multiple backend storage modules, a mapping relationship storage module, a key value calculation module, and a modulo operation unit. The mapping relationship storage module is configured to store a mapping relationship between identifiers of the backend storage modules and a modulo L operation, provided that L is the number of backend storage modules. The key value calculation module is configured to calculate the key value of the data to be stored using a hash algorithm, and to output the key value to the modulo operation unit. Further, the modulo operation unit is configured to perform the modulo operation on the obtained key value by the number of backend storage modules, to obtain, from the mapping relationship storage module and based on a remainder of the modulo operation, an identifier of the backend storage module mapped by the remainder of the modulo operation, and to output the key value in the modulo operation and the corresponding data to the backend storage module with the corresponding identifier. In addition, the backend storage module determines that a preconfigured hash table does not contain data to be stored, and then stores the data to be stored and the corresponding key value.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 9:
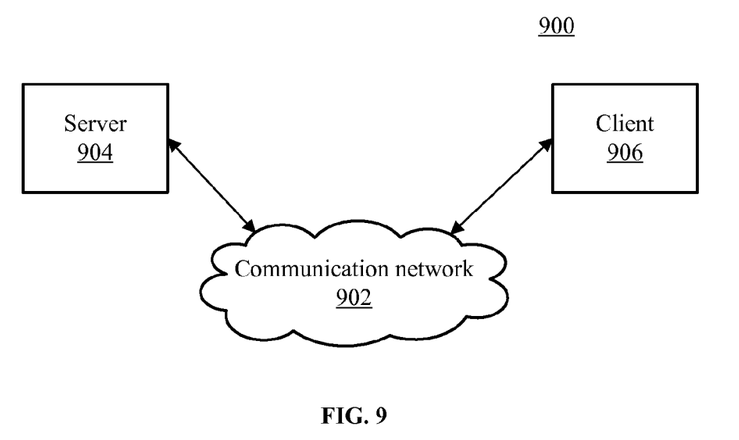
FIG. 9 illustrates an exemplary environment incorporating certain disclosed embodiments.

FIG. 9 illustrates an exemplary environment 900 incorporating certain disclosed embodiments. As shown in FIG. 9, environment 900 may include a server 904, a client 906, and a communication network 902. The server 904 and the client 906 may be coupled through the communication network 902 for information exchange, such as IM communication. Although only one client 906 and one server 904 is shown in the environment 900, any number of clients 906 or servers 904 may be included, and other devices may also be included.

Communication network 902 may include any appropriate type of communication network for providing network connections to the server 904 and client 906 or among multiple servers 904 or clients 906. For example, communication network 902 may include the Internet or other types of computer networks or telecommunication networks, either wired or wireless.

A client, as used herein, may refer to any appropriate user terminal with certain computing capabilities, such as a personal computer (PC), a work station computer, a server computer, a hand-held computing device (tablet), a smart phone or mobile phone, or any other user-side computing device.

A server, as used herein, may refer one or more server computers configured to provide certain server functionalities, such as database management and search engines. A server may also include one or more processors to execute computer programs in parallel.

Figure 10:
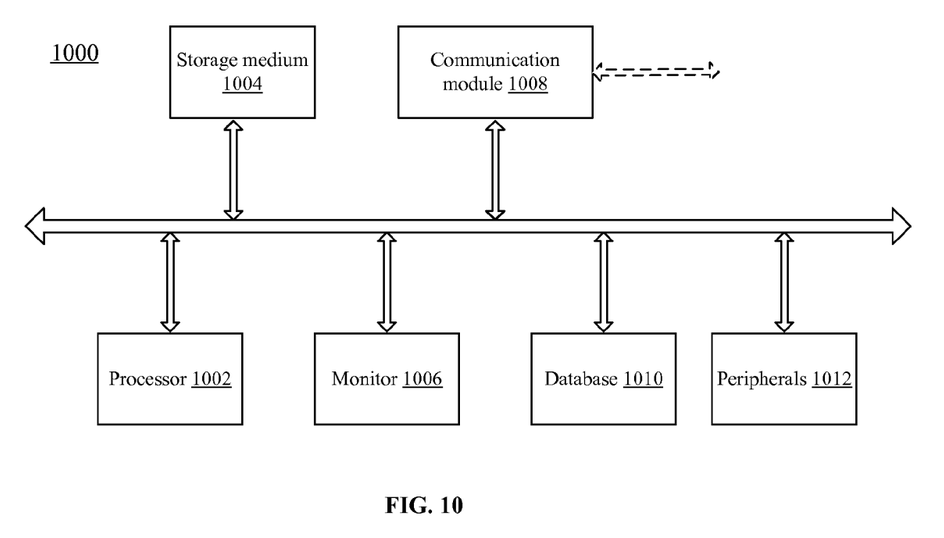
FIG. 10 illustrates an exemplary computer system consistent with the disclosed embodiments.

Server 904 and/or client 906 may be implemented on any appropriate computing platform. FIG. 10 shows a block diagram of an exemplary computer system 1000 capable of implementing server 904 and/or client 906.

As shown in FIG. 10, computer system 1000 may include a processor 1002, a storage medium 1004, a monitor 1006, a communication module 1008, a database 1010, and peripherals 1012. Certain devices may be omitted and other devices may be included.

Processor 1002 may include any appropriate processor or processors. Further, processor 1002 can include multiple cores for multi-thread or parallel processing. Storage medium 1004 may include memory modules, such as ROM, RAM, flash memory modules, and erasable and rewritable memory, and mass storages, such as CD-ROM, U-disk, and hard disk, etc. Storage medium 1004 may store computer programs for implementing various processes, when executed by processor 1002.

Further, peripherals 1012 may include I/O devices such as keyboard and mouse, and communication module 1008 may include network devices for establishing connections through the communication network 902. Database 1010 may include one or more databases for storing certain data and for performing certain operations on the stored data, such as database searching.

Figure 2:
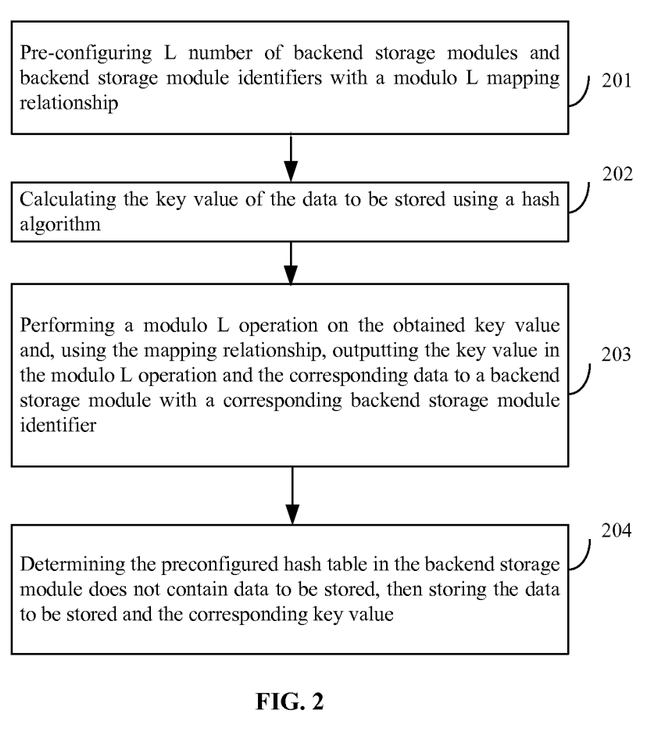
FIG. 2 is a flow chart of a hash algorithm-based data storage method according to the disclosed embodiments.

In operation, e.g., IM data processing, server 904 and/or client 906 may perform certain data storage processes to facilitate storing data and querying data. FIG. 2 is a flow diagram of an exemplary hash algorithm-based data storage method according to the disclosed embodiments. As shown in FIG. 2, the flow or process includes:

Step 201, pre-configuring L number of backend storage modules and backend storage module identifiers with a modulo L mapping relationship.

The backend storage modules may be internal storage units at the client side, such as RAM, flash memory, erasable and rewritable memory, hard disks, etc., or external storage units in independent servers. The L number of backend storage modules may be distributed over different databases, storage devices, and/or computer systems. The data to be stored in the backend storage modules may needed to be classified first and the classified data is stored in corresponding distributed backend storage module.

The number of the backend storage modules may be a prime number (L). For example, if L is the prime number 3, there are 3 backend storage modules preconfigured, and the identifiers of the backend storage modules with the modulo L mapping relationship can be set as 0, 1, and 2. More particularly, the mapping relationship between the identifiers of the backend storage modules and the modulo L operation can be: if the remainder of the data modulo L operation is 0, the data is correspondingly stored in the backend storage module with the backend storage module identifier of 0; if the remainder of the data modulo L operation is 1, the data is correspondingly stored in the backend storage module with the backend storage module identifier of 1, and so on.

Step 202, calculating the key value of the data to be stored using a hash algorithm.

In this step, the hash algorithm include: CRC32, MD5, or SHA. In certain embodiments, the MD5 algorithm is used for the calculation.

Step 203, performing a modulo L operation on the obtained key value and, using the mapping relationship, outputting the key value in the modulo L operation and the corresponding data to a backend storage module with a corresponding backend storage module identifier.

In this step, a modulo operation is applied on the obtained key value (KEY) from Step 202 using the number of backend storage modules (L) as the modulo. That is, for the obtained key value KEY, getting the remainder by using the number of backend storage modules as the modulo. Through KEY MOD L (i.e., KEY modulo by L), the backend storage identifier with the modulo L mapping relationship can be obtained to select the corresponding backend storage module.

Figure 3:
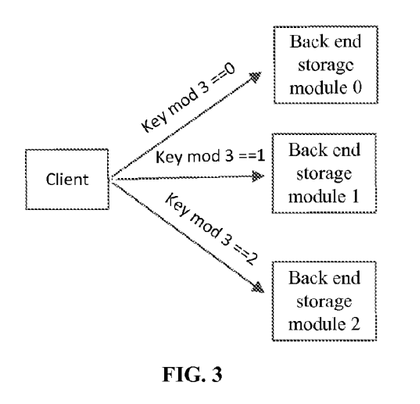
FIG. 3 is a schematic diagram of the selection of the backend storage module for storing data based on the key value of the data and the number of backend storage modules according to the disclosed embodiments.

FIG. 3 illustrates the selection of the backend storage module for storing data according to the key value of the data and the number of backend storage modules according to the disclosed embodiments. As shown in FIG. 3, using L=3 as an example, the key value of KEY mod 3==0 and the corresponding data are outputted to the backend storage module 0 (the corresponding identifier of the backend storage module is 0); the key value of KEY mod 3==1 and the corresponding data are outputted to the backend storage module 1; and the key value of KEY mod 3==2 and the corresponding data are outputted to the backend storage module 2.

That is, there is a mapping relationship between the identifiers of the multiple backend storage modules and the remainders of modulo by L (i.e., the modulo L operation). The identifiers may have a one-to-one relationship with all remainders of the modulo L, as shown in FIG. 3, or the identifiers may have a different mapping relationship with the remainders of the modulo L, such as any appropriate linear and non-linear mapping functions.

The key value of the data may be used to first select a particular backend storage module. Further storage operations are then performed with respect to the selected backend storage module, and other distributed backend storage modules are not affected.

Step 204, determining the preconfigured hash table in the backend storage module does not contain data to be stored, then storing the data to be stored and the corresponding key value.

The backend storage module may have a hash table preconfigured. More than one hash tables may also be used. In this step, it is first determined that the hash table does not contain data that corresponds to the key value and is the same as the data to be stored. Then, the key value and the corresponding data are stored. The number of the preconfigured hash tables of the backend storage module can be set as a prime number, which can be a large prime number. The hash table can use multiple parallel hash buckets based on the preset prime number.

Figure 4:
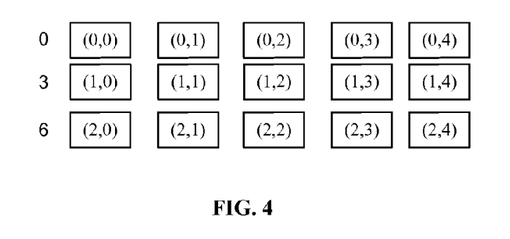
FIG. 4 is a schematic diagram of a hash table according to the disclosed embodiments.

FIG. 4 illustrates a hash table implementation according to the disclosed embodiments. As shown in FIG. 4, the hash table uses 3 hash buckets in parallel, i.e., the number of hash buckets is 3. For example, when the number of the preconfigured backend storage modules is 3, and when the key value of KEY mod 3==0 and the corresponding data are outputted to the backend storage module 0, the identifiers of the hash buckets are 0, 3, and 6, corresponding to the key values of 0, 3, and 6, respectively. The depth of each hash bucket is 5.

Figure 5:
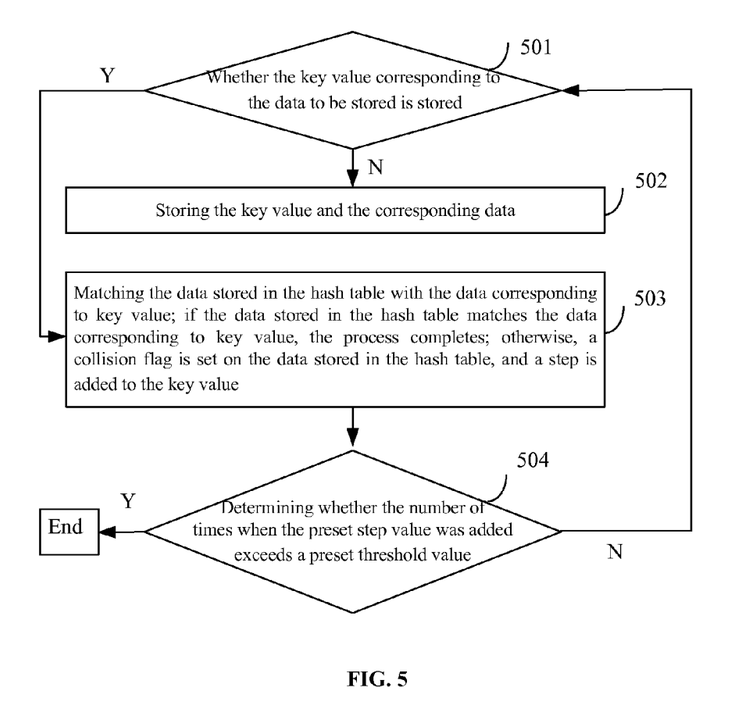
FIG. 5 is a flow chart of a process for determining that the preconfigured hash table of the backend storage module does not contain data to be stored and storing the data to be stored and the corresponding key value according to the disclosed embodiments.

FIG. 5 illustrates a process for determining that the preconfigured hash table of the backend storage module does not contain data to be stored and storing the data to be stored and the corresponding key value. As shown in FIG. 5, the process includes:

Step 501, sequentially determining whether the preconfigured hash table of the backend storage module stores the key value corresponding to the data to be stored. If it is determined that no such key value is stored, continuing to Step 502. Otherwise, continuing to Step 503;

In the step, the preconfigured hash table of the backend storage module is sequentially searched (e.g., line by line to search hash table lines). That is, the hash table in FIG. 4 is searched sequentially from the first line.

Step 502, storing the key value and the corresponding data.

In the step, if the preconfigured hash table does not contain the key value, it indicates that the data corresponding to the key value has not been stored. The key value and the corresponding data are stored in the hash table, in a line after the last line containing stored data.

Step 503, matching the data stored in the hash table with the data corresponding to key value. If the data stored in the hash table matches the data corresponding to key value, the process completes. Otherwise, a collision flag is set on the data stored in the hash table, and a step (i.e., a preset unit of numeric value) is added to the key value.

In this step, if the hash table contains the key value, it indicates that certain data corresponding to the key value has been stored in the hash table. It needs to be further determined whether the data stored in the hash table corresponding to key value matches the data to be stored. If the data stored in the hash table matches the data to be stored, it indicates that the data stored in the hash table is the data to be stored, and there is no need to store the data to be stored. On the other hand, if the data stored in the hash table does not match the data to be stored, it indicates that the key value corresponding to the stored data collides with the key value corresponding to the data to be stored. The key value corresponding to the data to be stored needs to be reconfigured so as to uniquely identify the data to be stored. Thus, the current key value is added by a step value and the matching step continues. At the same time, a collision flag is set on the data stored in the hash table and colliding with the data to be stored, indicating a collision has happened with the stored data.

Step 504, determining whether the number of times when the preset step value was added exceeds a preset threshold value. If the number of times exceeds the preset threshold value, the process completes. If the number of times does not exceed the preset threshold, continuing to step 501.

In this step, the product of the preset step value and the number of times is applied to a modulo operation by the number of the backend storage modules N, and the remainder of modulo N operation is 0. That is, the preset step value is multiplied by the number of times, then the product of the multiplication is modulo by the number of the backend storage modules N, and the remainder of the modulo operation is 0. The formula is:

$$\text{Key mod } N = (\text{Key} + m*\text{step}) \text{mod} N = 0, \text{ or}$$

$$(m*\text{step}) \text{mod} N = 0$$

Wherein,
Key: the key value corresponding to the stored data;
N: the number of the backend storage modules;
m: the preset number of times the step can be added;
step: the preset step value.

Afterwards, the process of the hash algorithm-based data storage method completes.

As described above, according to the disclosed embodiments, the hash algorithm-based data storage method uses a distributed storage approach. With multiple preconfigured backend storage modules, the data to be stored is classified based on the key value of the data to be stored and the number of backend storage modules, and the classified data are respectively stored in the corresponding backend storage modules. The storage space requirements for the storage devices can be reduced. At the same time, for the data with colliding key values when being stored, the hash table uses a stepping approach for storing data and makes every data to be stored have a unique key value. Thus, in the distributed storage system, the conflicting data can be located on the same backend storage module for subsequent query and read operations. Further, the depth of buckets in the hash table is the number of times of the step adding, effectively reducing the space needed for storing the hash table.

According to the disclosed embodiments, when the existing data storage space needs to be resized up in parallel, e.g., increasing the number of parallel backend storage modules, it only requires that the number of the added backend storage modules is a multiple of the number of the initial backend storage modules. And the modulo operation performed on the key value corresponding to the data to be stored uses the updated number of the backend storage modules. For example, if the backend storage modules L are resized up by doubling each time, the following equation can be satisfied: $(m*\text{step}) \text{mod}(2n*L) = 0$ (n=0, 1, 2, 3...). The step value "step" can then be determined based on this equation. After the step is determined, the solution for resizing up the data storage in parallel can also be determined, effectively satisfying the needs for data storage parallel expansion.

After the data is stored in the distribute backend storage modules, a query process may be used for subsequently querying the stored data by the user.

Figure 6:
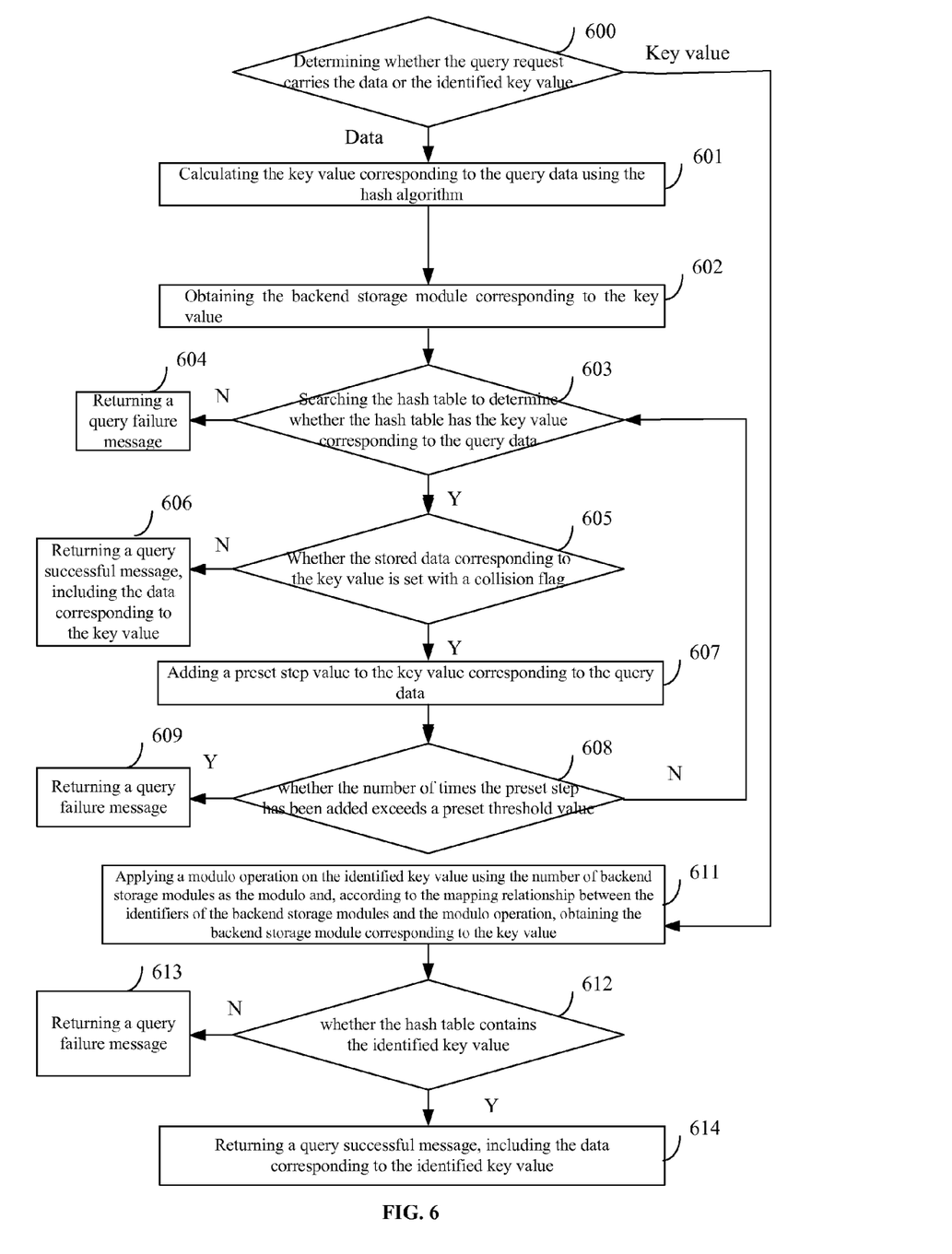
FIG. 6 is a flow chart of a data query process according to the disclosed embodiments.

FIG. 6 is a flow diagram of the process for data query according to the disclosed embodiments. As shown in FIG. 6, the process includes:

Step 600, obtaining the query request, and determining whether the query request carries the data or the identified key value. If the query request carries the data, continuing to Step 601. If the query request carries the identified key value, continuing to Step 611.

In this step, determining whether the query request carries the data or the identified key value may be done by using certain existing technologies, the details of which are omitted.

Step 601, calculating the key value corresponding to the query data using the hash algorithm.

Step 602, obtaining the backend storage module corresponding to the key value.

In this step, after obtaining the key value, the number of backend storage modules is used to perform a modulo operation on the key value to obtain the remainder of the key value modulo by the backend storage module number. The identifier of the backend storage module can then be obtained and, based on the mapping relationship between the identifiers of the backend storage modules and the modulo operation, the backend storage module identifier for the data corresponding to the key value can be obtained.

Step 603, sequentially searching the hash table to determine whether the hash table has the key value corresponding to the query data. If the hash table does not have the key value, continuing to Step 604. Otherwise, continuing to Step 605.

Step 604, returning a query failure message, and the process completes.

In this step, if the key corresponding to the query data cannot be found in the hash table, it indicates that the query data is not stored in the hash table.

Step 605, determining whether the stored data corresponding to the key value is set with a collision flag. If the data is not set with a collision flag, continuing to Step 606. Otherwise, continuing to Step 607.

Step 606, returning a query successful message, including the data corresponding to the key value.

Step 607, adding a preset step value to the key value corresponding to the query data.

In this step, Key=Key+step. After the key value corresponding to the query data is added by the preset step, determining whether the stored data corresponding to updated key value with added step is set with a collision flag.

Step 608, determining whether the number of times the preset step has been added exceeds a preset threshold value. If the number of times exceeds the preset threshold value, continuing to Step 609. Otherwise, returning back to Step 603.

Step 609, returning a query failure message, and the process completes.

Step 611, applying a modulo operation on the identified key value using the number of backend storage modules as the modulo and, according to the mapping relationship between the identifiers of the backend storage modules and the modulo operation, obtaining the backend storage module corresponding to the key value.

Step 612, searching whether the hash table contains the identified key value. If the hash table does not have the identified key value, continuing to Step 613. Otherwise, continuing to Step 614.

Step 613, returning a query failure message, and the process completes.

Step 614, returning a query successful message, including the data corresponding to the identified key value.

Afterwards, the process for querying the data completes.

As described above, according to the disclosed embodiments, the data query method uses a distributed hash algorithm. First, the identifier of the backend storage module is selected based on the key value corresponding to the query data; then the hash table in the corresponding backend storage module is searched and queried. Thus, the complexity of the query can be effectively reduced and the speed of data access can be improved. For a data query request, when there is a hash collision, the complexity of the query is O(m), where m is the number of the time adding the preset step value. The query response speed is greatly improved. Further, for the query request with identified key value, the complexity of the query is O(1).

Figure 7:
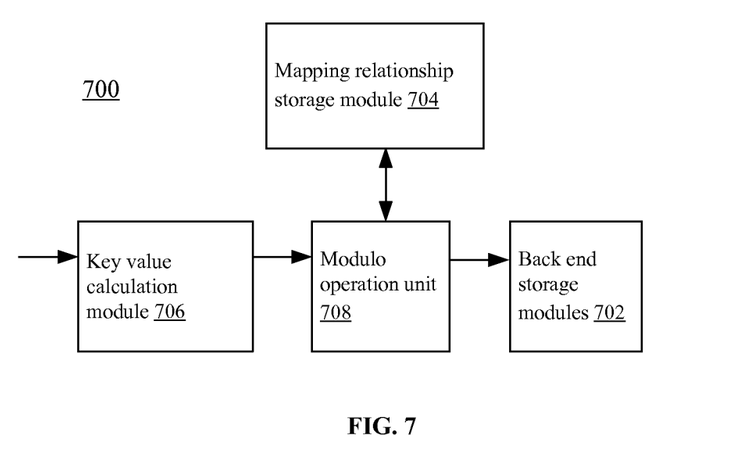
FIG. 7 is a schematic diagram of a hash algorithm-based data storage apparatus according to the disclosed embodiments.

FIG. 7 is a schematic diagram of a hash algorithm-based data storage system 700 according to the disclosed embodiments. As shown in FIG. 7, the data storage system 700 includes multiple backend storage modules 702, a mapping relationship storage module 704, a key value calculation module 706, and a modulo operation unit 708. Data storage system 700 may be implemented on computer system 900 by hardware, software, or a combination of hardware and software.

The mapping relationship storage module 704 is configured to store the mapping relationship between identifiers of the backend storage modules 702 and modulo L operation.

The key value calculation module 706 is configured to calculate the key value of the data to be stored using a hash algorithm, and to output the key value to the modulo operation unit 708.

The modulo operation unit 708 is configured to perform a modulo operation on the obtained key value based on the number of backend storage modules 702, to obtain, from the mapping relationship storage module 704 and based on the remainder of the modulo operation, the identifier of the backend storage module 702 mapped by the remainder of the modulo operation, and to output the key value in the modulo operation and the corresponding data to the backend storage module 702 with the corresponding identifier;

The backend storage module 702 is configured to determine whether the preconfigured hash table does not contain data to be stored, and to store the data to be stored and the corresponding key value.

In the embodiments of the present invention, the backend storage modules 702 may be RAM, flash memory, erasable and rewritable memory, or hard disks.

Figure 8:
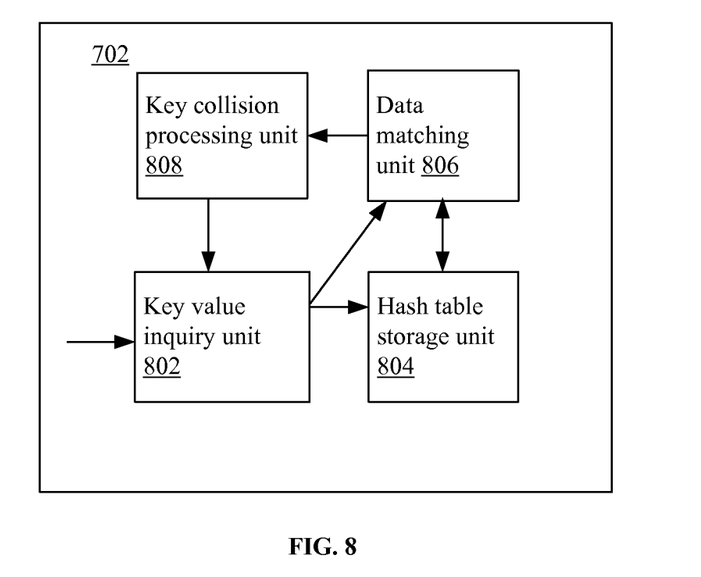
FIG. 8 illustrates an exemplary backend storage module according to the disclosed embodiments.

Further, as shown in FIG. 8, the backend storage module 702 may include a key value inquiry unit 802, a hash table storage unit 804, a data matching unit 806, and a key collision processing unit 808.

The key value inquiry unit 802 is configured to sequentially determine whether the hash table in the hash table storage unit 804 stores the key value corresponding to the data to be stored. If not, the key value inquiry unit 802 outputs the key value and the corresponding data to the hash table storage unit 804 for storage. Otherwise, the key value inquiry unit 802 outputs the key value and the corresponding data to the data matching unit 806.

The data matching unit 806 is configured to match the received data with the data stored in the hash table of the hash table storage unit 804. If the received data matches the data stored in the hash table, the data matching unit 806 performs no further processing. Otherwise, the data matching unit 806 sets a collision flag on the stored data, and outputs the key value to the key collision processing unit 808.

The key collision processing unit 808 is configured to add a preset step value to the received key value, and to determine whether the number of times the preset step has been added to the key value exceeds a preset threshold value. If the number of times exceeds the preset threshold value, the key collision processing unit 808 performs no further processing. Otherwise, the key collision processing unit 808 outputs the key value with added step to the key value inquiry unit 802.

The above descriptions are certain embodiments of the present invention, and not intended to limit the scope of the present invention. Without departing from the spirit and principles of the present invention, any modifications, equivalent replacements, and improvements, etc., should be included in the protection scope of the present invention.

What is claimed is:

1. A hash algorithm-based data storage method, comprising:

provided that L is a natural number greater than 1, preconfiguring L number of backend storage modules;

calculating a key of data to be stored using a hash algorithm;

selecting a first backend storage module corresponding to the key from the L number of backend storage modules;

outputting the key and the data to be stored to the first backend storage module, wherein the first backend storage module comprises a plurality of hash buckets;

determining whether there is one hash bucket in the plurality of hash buckets that stores the key;

when the key is stored in the one hash bucket, matching stored data corresponding to the key in the one hash bucket with the data to be stored;

when the stored data do not match the data to be stored, setting a collision flag on the stored data, and adding a preset step value to the key to provide another key; and repeating steps from determining whether there is another hash bucket that stores the another key, wherein a number of times that the preset step value is able to be repeatedly added for each collision has a preset threshold value and wherein the preset step value is a numeric value determined by the preset threshold value and the number L.

2. The method according to claim 1, wherein determining whether there is one hash bucket in the plurality of hash buckets that stores the key further comprises:

when the key is not stored in any hash bucket of the plurality of hash buckets, storing the key and the data to be stored in a hash table of the first backend storage module, the hash table comprising the plurality of hash buckets.

3. The method according to claim 1, further comprising multiplying the preset step value by the preset threshold value m, and performing the modulo L operation on product of the multiplication by the number L of the backend storage modules, wherein the remainder of the modulo L operation is 0 according to (m*step) mod L=0 to determine that the preset step value is the numeric value, wherein the step is the preset step value.

4. The method according to claim 1, wherein:

the number L of the backend storage modules is resized up by doubling every time according to an equation of (m*step)mod(2n*L)=0, wherein m is the preset threshold value, the step is the numeric value, n is an integer, and L is the number of the backend storage modules.

5. The method according to claim 1, further comprising:

based on a query request, obtaining a second key corresponding to the query request;

performing a modulo L operation on the second key by the number L of the backend storage modules;

based on a mapping relationship between identifiers of the backend storage modules and the modulo L operation, selecting a second backend storage module corresponding to the second key; and searching a second hash table of the second backend storage module to obtain data to be queried, the second hash table comprises a plurality of second hash buckets.

6. The method according to claim 5, wherein obtaining the second key corresponding to the query request further includes:

obtaining the query request;

determining whether the query request carries a query data or an identified key; and when the query request carries the query data, calculating a key corresponding to the query data; and using the calculated key as the second key corresponding to the query request; or when the query request carries the identified key, using the identified key as the second key corresponding to the query request.

7. The method according to claim 6, wherein, when the query request carries the query data, searching the second hash table of the second backend storage module to obtain the data to be queried further includes:
    searching the second hash table to determine that the second hash table has the second key corresponding to the query data;
    determining whether stored data corresponding to the second key is set with a collision flag; and
    when the stored data is not set with the collision flag, returning a query successful message containing the stored data corresponding to the second key; and
    when the stored data is set with the collision flag, adding a second preset step value to the second key corresponding to the query data, wherein the second preset step value is the numeric value; and
    determining that a number of times the preset step value has been added does not exceed the preset threshold value and repeating the step of searching the second hash table to determine the second hash table has the second key corresponding to the query data.

8. The method according to claim 6, wherein, when the query request carries the identified key, searching the second hash table of the second backend storage module to obtain the data to be queried further includes:
    searching whether the second hash table contains the identified key; and
    when the second hash table contains the identified key, returning a query successful message containing stored data corresponding to the identified key.

9. A hash algorithm-based data storage device implemented by a computer system, comprising:
    L number of backend storage modules, wherein each backend storage module comprises a key inquiry unit, a data matching unit, a hash table storage unit, and a key collision processing unit;
    a key value calculation module; and
    a modulo operation unit, wherein:
    the key value calculation module is configured to calculate a key of data to be stored using a hash algorithm, and to output the key to the modulo operation unit;
    the modulo operation unit is configured to select a first backend storage module corresponding to the key from the L number of backend storage modules,
    and to output the key and the data to be stored to the hash table storage unit in the first backend storage module for storage, wherein the hash table storage unit comprises a plurality of hash buckets;
    the key value inquiry unit is configured to determine whether there is one hash bucket in the plurality of hash buckets that stores the key, and when the key is stored in the one hash bucket in the first backend storage module, to output stored data corresponding to the key to the data matching unit;
    the data matching unit is configured to match the stored data in the one hash bucket with the data to be stored; and
    when the stored data do not match the data to be stored, to set a collision flag on the stored data, and to output the key to the key collision processing unit; and
    the key collision processing unit is configured to add a preset step value to the key to provide another key; and when a number of times that the preset step value is able to be repeatedly added for each collision does not exceed a preset threshold value, to output the another key to the key value inquiry unit to determine whether there is another hash bucket that stores the another key,
    wherein the preset step value is a numeric value determined by the preset threshold value and the number L.

10. The system according to claim 9, wherein the each backend storage module comprises at least one of a RAM, a flash memory, an erasable and rewritable memory, and a hard disk.

11. The system according to claim 9, wherein
    the key value inquiry unit is configured, when the key is not stored in any hash bucket of the plurality of hash buckets, to output and store the key and the data to be stored in the hash table storage unit of the first backend storage module.

12. The method according to claim 1, further comprising:
    pre-configuring a mapping relationship between identifiers of the backend storage modules and a modulo L operation;
    performing the modulo L operation on the key by the number L of the backend storage modules to obtain a remainder of the modulo L operation;
    based on the mapping relationship between the identifiers of the backend storage modules and the modulo L operation and the remainder of the modulo L operation, determining a first backend storage module identifier corresponding to the key of the data to be stored; and
    outputting the key and the data to be stored to the first backend storage module corresponding to the first backend storage module identifier.

13. The method according to claim 2, further comprising:
    determining that the hash table in the first backend storage module does not contain the data to be stored; and
    storing the data to be stored and the key in the hash table of the first backend storage module.

14. The method according to claim 1, wherein the data to be stored comprise instant message data from a contact list of a user.

15. The method according to claim 1, wherein the each backend storage module comprises at least one of a RAM, a flash memory, an erasable and rewritable memory, and a hard disk.

16. The system according to claim 9, wherein the preset step value, step, is multiplied by the preset threshold value m, and the modulo L operation is performed on product of the multiplication by the number L of the backend storage modules, wherein the remainder of the modulo L operation is 0 according to an equation of (m*step)mod L=0 to determine that the preset step value is the numeric value.

17. The system according to claim 9, wherein the number L of the backend storage modules is resized up by doubling every time according to an equation of (m*step)mod(2n*L)=0, wherein m is the preset threshold value, the step is the numeric value, n is an integer, and L is the number of the backend storage modules.

18. The system according to claim 9, further comprising a mapping relationship storage module configured to store a mapping relationship between identifiers of the backend storage modules and a modulo L operation, provided that L is the number of backend storage modules, wherein the modulo operation unit is configured to perform the modulo L operation on the key by the L number of the backend storage modules, to obtain, from the mapping relationship storage module and based on a remainder of the modulo L operation, a first identifier of a first backend storage module mapped by the remainder of the modulo L operation.

19. The system according to claim 9, wherein the backend storage module is further configured to determine that the hash table storage unit does not contain the data to be stored, and then to store the data to be stored and the key in the hash table storage unit of the first backend storage module.

20. The system according to claim 9, wherein the key collision processing unit is configured, when the number of times that the preset step value is able to be added for each collision exceeds the preset threshold value, to perform no further processing.

* * * * *